United States Patent

[11] 3,586,425

| [72] | Inventor | Donald L. Gilman |
| | | 1115 Vine St., Cincinnati, Ohio 45216 |
| [21] | Appl. No. | 832,315 |
| [22] | Filed | June 11, 1969 |
| [45] | Patented | June 22, 1971 |

[54] SPECTACLES HAVING SPRING-BIASED HINGES
2 Claims, 9 Drawing Figs.

[52] U.S. Cl............................................. 351/113,
16/189, 351/121
[51] Int. Cl........................................ G02c 5/16,
G02c 5/20
[50] Field of Search............................. 351/113,
121, 153, ; 16/128, 189; 267/155

[56] References Cited
UNITED STATES PATENTS

| 1,275,933 | 8/1918 | James.......................... | 351/113 |
| 2,367,418 | 1/1945 | Morrell......................... | 351/113 UX |
| 2,967,325 | 1/1951 | Herzfeld....................... | 351/113 X |

Primary Examiner—David Schonberg
Assistant Examiner—John W. Leonard
Attorney—Dybvig & Dybvig ABSTRACT: Spectacle hinges are provided with spring devices biasing the temples toward one another so that, when released, the temples fold against the spectacle frame. Each spring device includes a helically coiled portion coaxial with the hinge barrel and projecting slightly above the hinge barrel. In one embodiment, the hinge pin is longer than the hinge barrel for receiving the spring device. In a preferred embodiment the spring device has a wire length that replaces the usual hinge pin.

PATENTED JUN22 1971
3,586,425
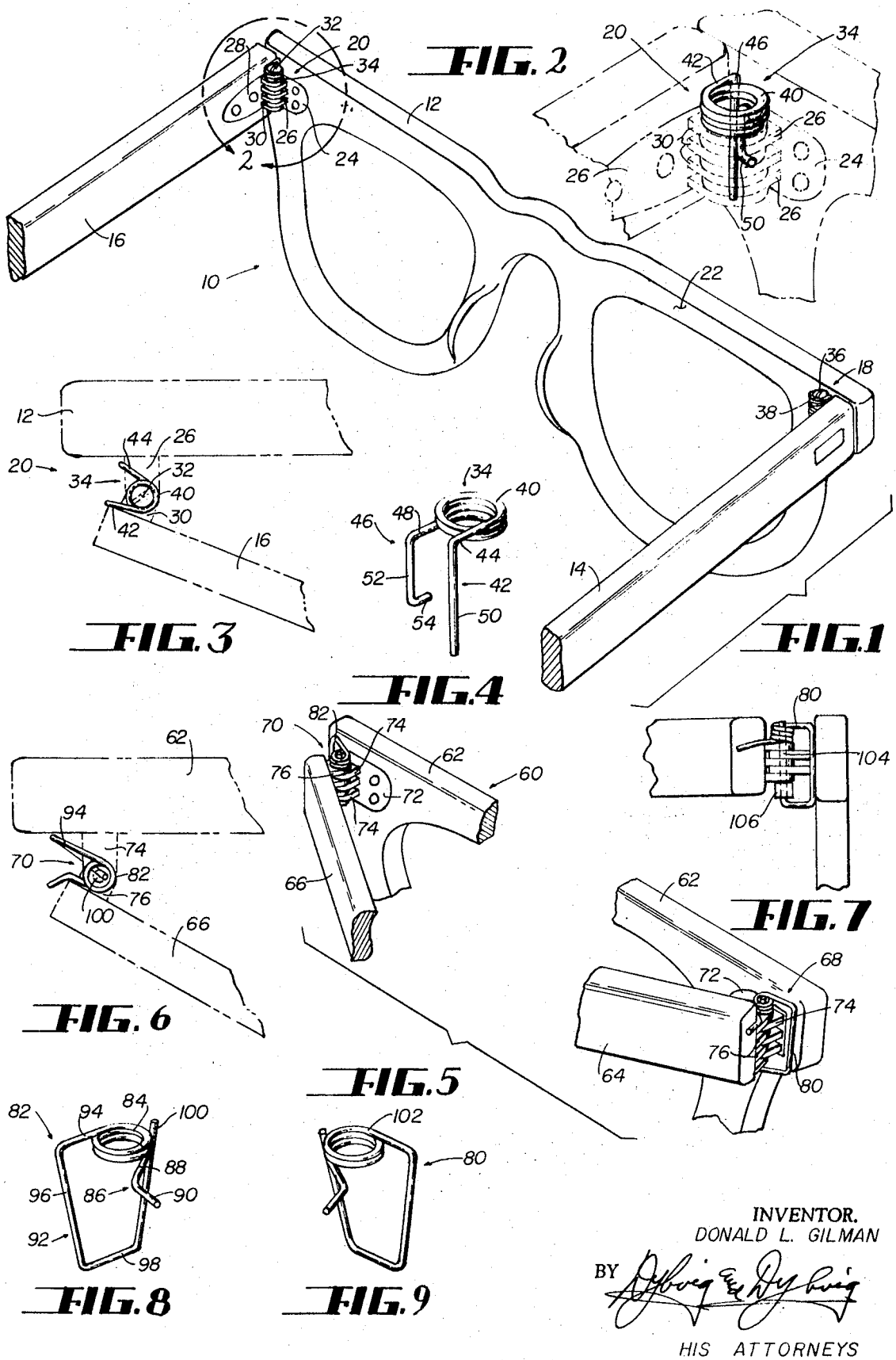
INVENTOR.
DONALD L. GILMAN
BY
HIS ATTORNEYS

SPECTACLES HAVING SPRING-BIASED HINGES

This invention relates to spectacles and more particularly to hinge constructions for spectacles of the type biasing the temples toward one another whereby they firmly engage the head of the wearer and, when the spectacles are removed, fold against the back face of the spectacle frame.

The known devices for causing temples to fold toward one another and thus apply pressure to the face of the user and properly maintain the spectacles in a comfortable wearing position are not entirely satisfactory. The devices most commonly used are simple rubber rings or the like which are difficult to install. Once installed they rapidly deteriorate and thus require frequent replacement. It has also been proposed to replace one or more of the hinge plates to provide space for a spring device. Of course, great care would have to be taken to remove the hinge plates and the likelihood of a serious weakening of the hinge is apparent. Other spring devices of which I am aware are unduly complicated and expensive.

An object of this invention is to provide an improved hinge construction for spectacles of the type which bias the temples toward a folded position, which hinge construction is inexpensive and simple to install. It is also an object of this invention to provide spring devices for spectacle hinges which can easily be attached to existing spectacles.

In one form of my invention the hinge pins ordinarily supplied with the spectacles are replaced by longer hinge pins which project above the hinge barrels. Spring devices, one for each hinge, have coiled or convoluted intermediate portions encircling the hinge pins above the barrels. The ends of the spring devices are confined between the temples and the spectacle frame on the outside of the hinge barrels. In another and presently preferred form of my invention, each spring device is sufficiently long and so bent that one of its ends serves as a hinge pin. Existing hinge pins can easily be removed and replaced by the spring devices of this invention.

Other objects and advantages will become apparent from the following description and the drawing in which:

FIG. 1 is a perspective view of a portion of spectacles embodying hinges made in accordance with this invention;

FIG. 2 is an enlarged view of a hinge device in accordance with this invention and illustrates, in phantom lines, generally that part of the spectacles enclosed within the circle 2 of FIG. 1;

FIG. 3 is a plan view of a hinge with a spring device in accordance with this invention showing in phantom lines a temple partially folded toward the spectacle frame;

FIG. 4 is a perspective view of the spring device used in the hinge illustrated in FIGS. 1, 2 and 3;

FIG. 5 is a perspective view with portions broken away of spectacles provided with preferred hinge constructions in accordance with this invention;

FIG. 6 is a plan view of the spring device used in the left-hand hinge of FIG. 5 and illustrating a portion of the spectacles in phantom lines;

FIG. 7 is a side elevational view of the right-hand hinge construction shown in FIGS. 5 and 6 but having a lesser number of hinge barrel plates; and FIGS. 8 and 9 are perspective views of the left- and right-hand spring devices, respectively, used in the spectacles shown in FIGS. 5, 6 and 7.

Referring in greater detail to the embodiment illustrated in FIGS. 1 through 4, spectacles 10 made in accordance with this invention are illustrated in FIG. 1 having a spectacle frame 12 and right- and left-hand temples 14 and 16, respectively, connected by right- and left-hand hinge assemblies, generally designated 18 and 20, respectively, to the rear face 22 of the spectacle frame 12.

The hinge assembly 20 includes a first hinge mounting plate 24 affixed to the frame rear face 22 and having a plurality of apertured hinge barrel plates 26 projecting perpendicularly from the frame rear face 22. The hinge assembly 20 also includes a second hinge mounting plate 28 mounted on the inside surface of the left-hand temple 16 which also has a plurality of apertured hinge barrel plates, designated 30, projecting perpendicularly therefrom. When assembled, the hinge barrel plates 26 and 30 are interleaved with their apertures aligned and offset from the adjacent surfaces of the temple 16 and frame 12 to form a hollow hinge barrel that receives an elongate, threaded hinge pin 32. At least the lowermost of the apertures in the barrel plates 26 and 30 are threaded for threadedly receiving the hinge pin 32.

Normally, hinge pins for spectacles have a length nearly identical to the length of the hinge barrels. In accordance with this invention, the hinge pin 32 is longer than the hinge barrel formed by the barrel plates 26 and 30 for receiving a spring device, generally designated 34, as will be described below. The right-hand hinge assembly 18 is constructed substantially identically to the left-hand hinge assembly 20 but, of course, the positions of the hinge barrel plates relative to the hinge mounting plates are reversed. Thus, the right-hand hinge assembly 18 has an elongate hinge pin 36 which receives a spring device 38. As will become apparent, the spring device 38 includes the same parts as the left-hand spring device 34 but in a "reversed" position.

With reference to FIG. 4, the left-hand spring device 34 consists of a length of spring wire helically coiled intermediate its ends to form a coil spring section 40 having three concentric and aligned turns or convolutions of approximately the same diameter as the hinge barrel. One end portion, generally designated 42, of the spring device 34 includes a first wire length 44 projecting generally tangentially to the coil section 40 from the upper end thereof. The other end portion, generally designated 46, has a first wire length 48 projecting generally tangentially from the lower end of the coil section 40. As will become apparent, the tangentially projecting wire lengths 44 and 48 are of a sufficient length to project just beyond the hinge barrel plates 26 and 30 when the spring device 34 is assembled on the spectacles 10. Both end portions 42 and 46 are bent downwardly at approximately right angles to form downwardly extending, mutually parallel wire lengths 50 and 52, respectively. The extreme end of the end portion 46 may be bent at approximately right angles to form a terminal, inturned finger 54 parallel to the first wire length 48.

The spring device 34 is assembled onto the spectacles 10 in the manner illustrated in FIGS. 2 and 3. First the plates 26 and 30 are appropriately interleaved to form the hinge barrel. The spring device 34 is then nested on the uppermost of the hinge barrel plates with its coil section 40 coaxial with the aligned apertures in the hinge barrel. The end portions 42 and 46 of the spring device 34 are both located outside of the hinge barrel plates 26 and 30 whereupon the end portion 42 engages the associated temple 16 and the end portion 46 engages a surface fixed in relation to the frame 12. In the particular example illustrated, the hinge barrel plates 26 are sufficiently large that the end portion 46 engages the outside surface of at least some of the hinge barrel plates 26. When so mounted, the finger 54 of the end portion 46 is received between two of the plates 26. The spring device 34 is locked in the position shown in FIG. 2 by the enlarged head of the hinge pin 32 when assembly of the hinge 20 is complete.

The spring device 34 has a natural relaxed condition wherein its end portions 42 and 46 are parallel or, preferably, at an acute angle relative to one another. Because the end portions 42 and 46 are confined between the frame and the temple on the outside of the hinge barrel, the coil spring section 40 is more tightly coiled when the temple 16 is pivoted away from the frame rear face 22. The restoring torque of the spring device 34 which tends to unwind the turns of the coil section 40 exerts a force against the end portion of the temple 16 closest to the spectacle frame 12. Accordingly, when the temple 16 is brought to the position shown in FIG. 1, which is its ordinary position when the spectacles 10 are being worn, the spring device 34 exerts a considerable torque against the aforementioned end of the temple 16. As soon as the spectacles 10 are removed from the wearer and the temple 16 thereby released, the spring device 34 tends to return to its relaxed condition, thereby causing the temple 16 to pivot toward the temple 14, which thereby folds against the rear face 22 of the spectacle frame 12. The finger 54, because confined between a pair of hinge barrel plates 26, anchors the end portion 46 adjacent the frame rear face 22. Hence, the restoring torque is efficiently applied directly to the temple 16.

The spring device 38, which has end portions (not shown) located toward the outside of the hinge plates forming the hinge barrel of the hinge assembly 18, similarly coacts against the inner end portion of the temple 14. Accordingly, both the temples 14 and 16 firmly bear against the head of the wearer and, when the spectacles are removed, automatically fold toward the frame rear face 22. Because of the efficient transfer of the restoring torque to the temples 14 and 16, they fold against the spectacle frames 12 with a snap action.

The wire forming the spring devices 34 and 38 is preferably of a relatively narrow gauge so that the three turns illustrated forming the coil section 40 have a total axial length on the order of one-sixteenth inch. Most modern spectacle frames are sufficiently massive that the entire hinge assemblies 18 and 20 are hidden by the frame 12 and the temples 14 and 16.

Because of the simplicity of the spring devices 34 and 38, they can be installed on spectacles by relatively unskilled people. Accordingly, they can be packaged with the elongate hinge pins 32 and 36 and installed either by the user or by an optical technician. It should be apparent that the construction of the spectacle hinges, aside from the spring devices and the hinge pins, is entirely conventional. Accordingly, the spring devices and hinge pins can readily be installed on existing spectacles.

FIGS. 5 and 6 disclose spectacles, generally designated 60, comprising a spectacle frame 62 to which right- and left-hand temples, designated 64 and 66, respectively, are pivotally attached by right- and left-hand hinge assemblies, generally designated 68 and 70, respectively. The hinge assemblies 68 and 70 include mounting plates 72 attached to the rear face of the frame 62 and hinge barrel plates 74 projecting perpendicularly therefrom. A plurality of hinge barrel plates 76 are interleaved with the hinge barrel plates 74 and attached to the inside faces of the temples 64 and 66 by mounting plates (not shown). The spectacles 60 as thus far described are conventional. In the presently preferred form of this invention, the hinge pins which are normally part of the right- and left-hand hinge assemblies 68 and 70 have been removed and replaced by spring devices, generally designated 80 and 82, respectively. As can be seen from FIGS. 8 and 9, the spring devices 80 and 82 are substantially identical. Therefore, only the left-hand spring device 82 will be described in detail.

Referring to FIG. 8, the left-hand spring device 82 consists of a length of spring wire coiled intermediate its ends to form a coil spring section 84 which again may be of three aligned and coaxial turns or convolutions. One end portion, generally designated 86, is relatively short and includes a first wire length 88 projecting generally tangentially to the coil section 84 from the lower end thereof. The end portion 86 is bent away from the coil section 84 to form a second or terminal wire length 90 lying in the same, generally horizontal plane as the first wire length 88 and at an angle of approximately 90° to 120° relative thereto. As best seen in FIG. 6, the first wire length 88 is sufficiently long to project to the outside of the hinge barrel plates 76 and the terminal length 90 engages the end face of the temple 66 which is closest to the left-hand end of the spectacles 60.

The other end portion, generally designated 92, of the spring device 82 is bent in the form of a rectangle and includes a first wire length 94 projecting generally tangentially from the upper end of the coil section 84, an elongate wire length 96 which extends downwardly from the first section 94 at approximately right angles, a third relatively short wire length 98 which is approximately parallel to the first wire length 94 and an upwardly extending terminal wire length or hinge pin portion 100 that is approximately as long as, and generally parallel to, the downwardly extending wire length 96.

The left-hand spring device 82 is assembled on the spectacles 60 by first inserting its hinge pin portion 100 upwardly through the bottom of the hinge barrel formed by the barrel plates 74 and 76. Then by inserting a screwdriver through the coil section 84, the coil section can be moved slightly upwardly and over into encircling relation to the wire hinge pin portion 100, whereupon the spring device 82 is automatically locked to the hinge barrel in the manner shown in FIGS. 5 and 6. When assembling the spring device 82, both end portions 86 and 92 are located outside of the hinge barrel plates 74 and 76. The spring device 80 shown in FIG. 9 is identical to the spring device 82 except that its coil spring section, designated 102, is reversely wound so that it may be assembled as part of the right-hand hinge assembly 68 in the manner shown in FIG. 5.

From the foregoing description it should be apparent that only the spring devices 80 and 82 are required to complete the assembly of the hinge assemblies 68 and 70. Therefore, they can be installed on existing spectacles merely by removal of the existing hinge pins (not shown), the installation progressing as described above. The spring wire forming the spring devices 80 and 82 normally is preferably of a smaller diameter than the replaced hinge pins. It has been found that this does not adversely affect the operation of the hinges. In fact, it is desirable to permit some freedom of movement of the temples away from the frames to insure adequate space for the end portions of the springs therebetween. The spring devices 80 and 82 are locked by themselves to their assembled hinge barrel plates and, therefore, may be used over long periods of time without any concern that they will be lost. Because the elongate, downwardly extending wire lengths 96 bear against the rear face of the spectacle frame 62 when the spectacles are worn, the spring devices 80 and 82 efficiently transfer almost all of their restoring torque to the temples.

The hinge assemblies 68 and 70 shown in FIGS. 5 and 6 are known as "seven-barrel" hinges because of the seven interleaved hinge barrel plates 74 and 76. The wire lengths 96 and 100 of the spring devices 80 and 82 are, therefore, made sufficiently long to straddle the seven hinge barrel plates of conventional "seven-barrel" hinges. Some spectacles have five barrel hinges and for such spectacles it is desirable to provide spring devices with shorter wire lengths 96 and 100. As an alternative, especially for spring devices to be sold to persons who may not be familiar with the differences in conventional hinge constructions, spacers may be packaged with the spring devices 80 and 82 for assembly on the lower ends of the wire lengths 100. Such an arrangement is shown in FIG. 7 wherein a spring device 80 is shown mounted on a five-barrel hinge 104. A spacer sleeve 106 has been inserted on the hinge pin portion thereof to increase the effective length of the five-barrel hinge 104.

Having thus described my invention, I claim:

1. In spectacles of the type having a spectacle frame and temples, a hinge construction for pivotally connecting a temple to the frame and for biasing the temple to a folded position against said frame, comprising a hinge barrel, a one-piece spring and hinge pin member comprising a spring wire having a coiled section, said wire having a first end portion and a second end portion, one of said end portions being bent into a generally rectangular shape, the terminal length of which forms an elongate pin member passing through and projecting beyond one end of said hinge barrel and serving as a hinge pin, said coiled section being coiled about said pin member, said first end portion acting against the end of said temple closest to said frame and said second end portion engaging a surface fixed in relation to said frame, said first end portion and said second end portion being located between said frame and said temple and projecting to the outside of said hinge barrel whereby said coiled section is more tightly coiled when said temple is pivoted away from said frame in position to engage the head of a wearer and said spring and hinge pin member exerts a restoring torque against said temple biasing it to a folded position against said frame.

2. In spectacles of the type having a spectacle frame and temples, a hinge construction for pivotally connecting a temple to the frame and for biasing the temple to a folded position against said frame, comprising a hinge barrel, an elongate pin member passing through and projecting beyond one end of said hinge barrel and serving as a hinge pin, and a spring having a section located beyond said one end of and coaxial with said hinged barrel coiled about said pin member, said spring further having a first end portion acting against the end of said temple closest to said frame and a second end portion engaging a surface fixed in relation to said frame, said first end portion and said second end portion being located between said frame and said temple and projecting to the outside of said hinge barrel whereby said spring is more tightly coiled when said temple is pivoted away from said frame in position to engage the head of a wearer and said spring exerts a restoring torque against said temple biasing it to a folded position against said frame.

UNITED STATES PATENT OFFICE
CERTIFICATE OF CORRECTION

Patent No. 3,586,425           Dated June 22, 1971

Inventor(s) Donald L. Gilman

It is certified that error appears in the above-identified patent and that said Letters Patent are hereby corrected as shown below:

Column 1, line 57, after the word "construction" add ---of spectacles having the same general hinge construction---.

Column 4, line 49, "sleever" should read ---sleeve---.

Signed and sealed this 9th day of November 1971.

(SEAL)
Attest:

EDWARD M. FLETCHER, JR.        ROBERT GOTTSCHALK
Attesting Officer              Acting Commissioner of Patents